United States Patent [19]
Mitchell et al.

[11] Patent Number: 5,298,186
[45] Date of Patent: Mar. 29, 1994

[54] PAINT SPRAY BOOTH ORGANIC DETACKIFICATION TREATMENT

[75] Inventors: David B. Mitchell, Arlington Heights; Thomas P. Curran, Round Lake; Wun T. Tai, Palos Hills, all of Ill.; Gary G. Engstrom, Kenosha, Wis.

[73] Assignee: W. R. Grace & Co.-Conn., New York, N.Y.

[21] Appl. No.: 944,136

[22] Filed: Sep. 11, 1992

Related U.S. Application Data

[63] Continuation of Ser. No. 523,698, May 15, 1990, abandoned.

[51] Int. Cl.$^5$ .................................................. C02F 5/10
[52] U.S. Cl. ............................... 252/180; 252/DIG. 8; 210/727; 524/595; 528/254
[58] Field of Search ............... 252/180, 174.23, 173, 252/DIG. 8; 210/727, 728, 729; 427/345; 524/595; 528/254

[56] References Cited

U.S. PATENT DOCUMENTS

| | | | |
|---|---|---|---|
| 3,861,887 | 1/1975 | Forney | 55/19 |
| 3,953,330 | 4/1976 | Tonkyn et al. | 210/728 |
| 4,481,116 | 11/1984 | Cabestany et al. | 210/728 |
| 4,600,513 | 7/1986 | Mizutani et al. | 210/728 |
| 4,629,572 | 12/1986 | Leitz et al. | 210/728 |
| 4,656,059 | 4/1987 | Mizuno et al. | 210/729 |
| 4,753,738 | 6/1988 | Huang | 210/727 |
| 4,792,364 | 12/1988 | Huang | 210/727 |
| 4,904,393 | 2/1990 | Mitchell et al. | 210/727 |
| 4,913,825 | 4/1990 | Mitchell | 210/727 |

FOREIGN PATENT DOCUMENTS

| | | |
|---|---|---|
| 121628 | 9/1981 | Japan. |
| 87411 | 5/1982 | Japan. |
| 151354 | 9/1983 | Japan. |

OTHER PUBLICATIONS

Lowering the free formaldehyde in open-formaldehyde adhesive resins, Szlezyngiee et al. Nyda Technol. Chem. 1973 (Abstract).

Primary Examiner—Prince Willis, Jr.
Assistant Examiner—J. Silbermann
Attorney, Agent, or Firm—James P. Barr

[57] ABSTRACT

A composition and method of treating paint spray booth water to detackify organic solvent based paint particles. The composition comprises a melamine polymer obtained from the reaction of melamine, aldehyde and an amine selected from the group consisting of dicyandiamide and glycine. These melamine polymers may be used in combination with a polyacrylamide, which combination exhibits surprising and unexpected effects when used to detackify organic solvent paint particles.

18 Claims, No Drawings

PAINT SPRAY BOOTH ORGANIC DETACKIFICATION TREATMENT

This is a continuation of application Ser. No. 07/523,698, filed May 15, 1990 now abandoned.

FIELD OF THE INVENTION

This invention relates to treatment of paint spray booth wastes, and in particular to novel polymeric compositions which detackify and prevent agglomeration of organic solvent based paints such as epoxy resin, high solids enamel and the like, which accumulate in spray booth process water.

BACKGROUND OF THE INVENTION

In the automotive and related coatings industries, it is estimated that between 20 to 40% of the total volume of paint sprayed is overspray. In the application of organic paints such as epoxy resins, high solids enamel paints and the like, it is necessary to trap the oversprayed paint. In large industrial applications such as auto body coating, this is accomplished by the use of water curtains on the interior booth walls, whereby the oversprayed coating material is incorporated into the water as it cascades down the walls of the booth into a reservoir. Typically, this water is recirculated back to the booth by means of recirculating pumps. The agglomeration and accumulation of live coating material in the water of the paint spray booth results in serious problems such as blockage of the pipes and circulating pumps as well as an accumulation of paint on the walls of the paint spray booth behind the water curtain. As more and more coating material is sprayed in the booth, the overspray material removed from the air builds up in the water in the form of tar-like coherent sludge which in a short time can foul the pumps and lines which circulate the booth's water. Furthermore, this sludge is extremely difficult to remove from the pump, lines, reservoir, and other internal surfaces of the system with which it comes in contact. The accumulation of raw paint masses in the water reservoir also creates serious maintenance problems when the system is periodically cleaned out, requiring much effort to remove the heavy build-up of coating material from the reservoir.

It is therefore desirable, to treat the water in the booth in such a way as to render the oversprayed coating material free of stickiness and tackiness so that it readily separates from the water, does not adhere to the spray booth walls, pipes, pumps; or other surfaces and internal components of the spray booth system, and maintains a floating, detackified condition.

Various treatments have been reported in the patent literature. For example, U.S. Pat. No. 3,861.887 discloses the treatment of paint booth wash water with a blend of polycationic water dispersible polymer with a water-soluble salt of an amphoteric metal to reduce the tackiness of paint. One problem with this approach is that the use of amphoteric metals such as zinc can create additional disposal concerns regarding the wastewater and sludge.

Another approach has been to use clay-based treatment. In U.S. Pat. No. 4,504,395, it is disclosed that certain hectorite clays can be effectively used to detackify oversprayed paint. One problem with this approach is that the resultant sludge produced by the clays is difficult to dewater, resulting in larger volumes of potentially hazardous materials requiring disposal in a secure landfill.

Yet another approach is to use a melamine-aldehyde acid colloid solution as disclosed in U.S. Pat. No. 4,656,059. The melamine-aldehyde acid colloid solution is produced by causing melamine to react with aldehyde, preferably formaldehyde or paraformaldehyde, to form a melamine-formaldehyde reaction product and then adding acid to the melamine-formaldehyde reaction product to form the melamine-aldehyde acid colloid solution. The use of this composition entails the following disadvantages: (a) the paint is not completely detackified, (b) the melamine-aldehyde acid colloid product typically contains greater than 0.1% free formaldehyde which is a suspect carcinogen, and (c) as a consequence of incomplete detackification the paint cannot be effectively dewatered and thus results in increased hazardous waste sludge production.

SUMMARY OF THE INVENTION

It is an object of this invention to provide a paint spray booth treating agent suitable for addition to the circulating water, which will provide superior and complete paint detackification.

It is another object of this invention to provide a treatment to paint spray booth circulating water which inhibits the accumulation of raw paint masses or sludge within the pumps, pipes, reservoirs, spray booth surfaces, or other internal components of the spray booth apparatus.

It is another object of this invention to provide a treatment agent for the overspray from a paint spray booth which completely detackifies organic solvent based paint particles in the spray booth water.

It is another object of this invention to provide a detackification agent which contains less than 0.1% free formaldehyde.

In accordance with this invention, there have been provided certain novel paint and sludge detackifying agents for use in controlling organic-solvent based paint overspray particles in paint spray booth water. The novel paint and sludge detackifying agents of this invention comprise certain melamine polymers obtained from the reaction of melamine, aldehyde and an amine-containing compound selected from the group consisting of dicyandiamide and glycine. These melamine polymers may also be used in combination with certain polyacrylamides which together exhibit surprising and unexpected results when detackifying organic paints.

Also provided in accordance with this invention is a method of detackifying paint particles in spray booth water comprising adding to the spray booth water an effective amount of the above melamine polymers, optionally in combination with a polyacrylamide to detackify the paint particles and recovering the detackified paint particles.

BRIEF DESCRIPTION OF THE DRAWING

FIG. 1 is a schematic isometric drawing of an apparatus used for evaluating control of paint overspray.

DETAILED DESCRIPTION

The present invention is directed to novel polymeric detackifying agents comprising certain melamine polymers which exhibit enhanced capabilities to detackify paint in aqueous systems. Suitable melamine polymers for use in this invention include those polymers obtained by the reaction of melamine, aldehyde, and an amine containing compound selected from the group consisting of glycine and dicyandiamide in the presence of an acid catalyst. The mole ratios of melamine:amine::aldehyde in the polymer are typically in the range 0.25–0.4:0.03–0.20:1, respectively.

In a preferred embodiment, the melamine polymer is obtained by the reaction of melamine, formaldehyde and glycine wherein the mole ratio of melamine:glycine in the polymer is between 6 – 13.2:1 and is most preferably 6.2:1. In another preferred embodiment, the melamine polymer is obtained by the reaction of melamine, formaldehyde and dicyandiamide wherein the mole ratio of melamine:dicyandiamide is between 0.8–6.5:1 preferably 2.0–2.5:1, most preferably 2.25:1.

Suitable aldehydes for use in this invention include formaldehyde, acetaldehyde, propionaldehyde, acrolein, crotonaldehyde, etc. and mixtures thereof and are preferably formaldehyde or a mixture of formaldehyde and propionaldehyde in a weight ratio of 1:0.25–0.75, respectively. Formaldehyde may be used in the gaseous state or in one of its polymer forms, such as paraformaldehyde or formalin. A major concern associated with the prior art melamine-formaldehyde co-polymers, in view of the suspect carcinogenicity of formaldehyde as indicated previously, is a free formaldehyde content of greater than 0.1%. Attempts to merely reduce the formaldehyde content in the polymer have generally resulted in inferior detackifying agents. However, it has now been found that the substitution of propionaldehyde for a portion of formaldehyde reduces the amount of free formaldehyde in the final melamine polymer to a level below 0.1% and yet still provides a composition with excellent detackification properties. Thus, in a most preferred embodiment, about 30% by weight of the formaldehyde is replaced with an equivalent molar proportion of propionaldehyde in either of the above preferred melamine polymers.

Also provided in accordance with this invention is the combination of the above melamine polymers and a suitable polyacrylamide which together provide surprisingly enhanced detackification properties. Those polyacrylamides suitable for use in this invention include, in general, the type disclosed in U.S. Pat. No. 2,820,777 which is hereby incorporated herein by reference and relied on in its entirety. These polymeric materials contain both amide and carboxylate groups. When anionic or nonionic polyacrylamides are used in this invention, they preferably have a molecular weight less than 15 million, most preferably between about 12 million and about 15 million. When cationic polyacrylamides are used in this invention, they preferably have a molecular weight less than 7 million.

The detackifying agents of this invention are generally added to the circulating water in paint spray booths to detackify and prevent agglomeration of organic-solvent based paint particles, raw paint masses and sludge. In general, the melamine polymers of this invention may be added to the paint spray booth apparatus water at a concentration of about 1000–5000 ppm preferably 2500–4000. The polyacrylamide, when used as the second component, is generally added at a concentration of at least 1 ppm, preferably between about 2 ppm and 5 ppm which thus corresponds to a weight ratio of melamine polymer:polyacrylamide in the range between 5000–200:1, and preferably 2000–500:1. The two components are preferably added separately to the water being treated with the melamine polymer being added first. However, compositions comprising a mixture of both components, particularly in the proportions stated above, can be mixed prior to treatment and then used advantageously to treat spray booth water. Prior to addition of the subject detackifying compositions, the pH of the spray booth water should be adjusted to at least 9.0. The compositions of this invention may be used in combination with defoamers, biocides, alkaline hydroxides (for pH control) and the like. The compositions of this invention are preferably free of clays so as to avoid dewatering problems associated with clay materials. The compositions of this invention are also preferably free of amphoteric metals, such as zinc, which can produce disposal concerns when the detackified solids are removed from the paint spray booth apparatus.

The melamine polymer/anionic polyacrylamide combinations are generally most useful for detackifying organic solvent based paints including, but not limited to epoxy resins paints, high solids enamel paints, i.e. paints having greater than 65% solids, polyurethane paints and the like.

In a typical paint spray booth/sludge removal system the detackified paint particles are transferred to solids concentrating equipment, such as cyclone separators, dissolved air flotation units (DAF), and the like, where a flocculant may be added to aid flotation and development of a sludge blanket. The concentrated solids, typically containing less than 10 percent solids, are skimmed off and transferred to a dewatering apparatus such as a plate and frame press, a Hoffman filter, a Hayden unit, and the like, where a second flocculant may be added as a sludge dewatering aid. The flocculant added in the solids concentrating equipment (flocculant A) may be the same as that added in the dewatering apparatus (flocculant B) or flocculant A may be anionic in which case flocculant B would be cationic or vice versa. A preferred anionic flocculant for use in the solids concentrating equipment is an anionic polyacrylamide having a molecular weight in the range of 10 to 23 million and a charge density in the range of $-0.5$ to 3.5 meq/q. A preferred cationic flocculant for use in the dewatering apparatus is a cationic polyacrylamide having a molecular weight in the range 5 to 8 million and a change density in the range $+1.0$ to 4.5 meq/q. The resultant sludge will typically contain 30 to 70 percent solids by weight which may then be further dried in air drying unit at an elevated temperature to about 80 to 90 percent solids by weight.

The effectiveness of this invention in detackifying paint overspray was evaluated using the paint spray booth apparatus depicted schematically in FIG. 1. The apparatus comprises a spray chamber (12) which has a front wall (14), side walls (16) and (18), a rear wall (20) and a floor (22). An elevated reservoir (24) is positioned at the front wall (14) with the top edge (26) of the front wall forming the lowest side of the reservoir such that water overflowing from the reservoir forms a water curtain for the front wall (14).

An outlet (28) is provided in the spray chamber floor (22), and water overflowing from the reservoir passes into outlet (28) and through piping (30) to a second mixing chamber (32). The second chamber (32) comprises end walls (34) and (36), side walls (38) and (40), and floor (42), and is divided into a first compartment (44) and a second compartment (46) by a weir (48). Water flowing from piping (30) flows into the first compartment, and an outlet (50) is provided in the floor of the second compartment. The top edge (52) of the weir terminates below the walls of the mixing chamber such that water overflows from the first compartment into the second compartment, and then into the outlet (50). Piping (52) directs the water from the outlet (50) into a third mixing chamber (54) which comprises four walls (56) (57) (58) and (59), and floor (60). The open end of the inlet piping (62) for pump (64) can be used to withdraw water from the third mixing chamber. Water pumped from the mixing chamber (54) is directed through pump outlet piping (65) into the elevated reservoir (24).

The top edge (21) of the rear wall (20) in spray chamber (12) terminates lower than the front top edge (26) of the front wall (14), and a paint spray gun (66) is positioned such that paint spray is directed toward the front wall (14) from a distance of 9". The capacity of the recirculating water system is about 14 liters and the recirculation rate is approximately 7.6 liters per minute.

In operation water circulation is begun to provide a curtain of water overflowing from top edge (26) toward floor (22) and passing adjacent to the front wall (14) of spray chamber (21). Paint is then sprayed from spray gun (66) toward the front wall (14) such that the spray becomes entrained in the water curtain. Generally, paint is sprayed at a rate within the range of from about 2.5 milliliters per minute to about 5.0 milliliters per minute, and the spraying continues until about 100 milliliters of paint has been sprayed.

Without further elaboration, it is believed that one skilled in the art, using the preceding detailed description, can utilize the invention to its fullest extent. The following examples are provided to illustrate the invention, but are not to be construed as limiting the invention in any way except as indicated on the appended claims. The examples provided herein include various embodiments of the invention. Other embodiments will be apparent to those skilled in the art from a consideration of the specification or practice of the invention disclosed herein. It is understood that modifications and variations may be practiced without departing from the spirit and scope of the novel concepts of this invention.

EXAMPLE 1

This example illustrates the superior detackification properties of the melamine polymers of this invention over the prior art melamine-formaldehyde co-polymers. Samples of melamine-dicyandiamide-formaldehyde polymers, as indicated in Table 1, were synthesized as follows:

In 170 g of demineralized water, 17 g (0.13 mol) of melamine and 5 g (0.06 mol) of dicyandiamide were added. 42 g (37% active or 0.51mol) of formaldehyde was added over a 10-12 minute period. The pH was maintained between 4.5-5.5. The mixture was then heated to 138-140° F. at which point 16.3 g (33% active or 0.13 mol) of muriatic acid was added within a 3 minute time period, and the reaction temperature increased to 148-150° F. The reaction was maintained at this temperature for 2 hours 40 minutes or until a viscosity of 6.7 cps was obtained at which point 250 g of demineralized water was added and the synthesis terminated. As indicated in Table 1, additional melamine polymer samples were synthesized varying the melamine:dicyandiamide mole ratios.

The relative effectiveness of these samples for paint detackification was determined as follows:

To the Paint Spray Booth 14 liters of deionized water was added followed by 5,000 ppm of the polymers or co-polymers as described in Table 1.

The pH of the water was increased to 9.0 by addition of sodium hydroxide. A high solids enamel paint was then sprayed (100 ml at a spray rate of 3.5 ml/min) at the front wall (14) after 5 minutes of mixing.

The degree of paint detackification was continually assessed in the second (31) and third (54) mixing chambers by rubbing the paint between forefinger and thumb. If the paint is completely detackified it will roll between thumb and forefinger. If the detackification is poor the paint will smear.

TABLE 1

Determination of the Optimum Mole Ratio of Melamine:Dicyandiamide

|  | (g) | (g) | (g) | (g) | (g) |
|---|---|---|---|---|---|
| Demineralized Water | 170 | 170 | 170 | 170 | 170 |
| Melamine | 22 | 12 | 17 | 20 | 21 |
| Dicyandiamide | — | 10 | 5 | 2 | 1 |
| Formaldehyde (37% active) | 42 | 42 | 42 | 42 | 42 |
| Muriatic Acid (31% active) | 16 | 16 | 16 | 16 | 16 |
| Demineralized Water | 250 | 250 | 250 | 250 | 250 |
| Melamine:Dicyandiamide Molarity Ratio | — | 0.8:1 | 2.25:1 | 6.5:1 | 14.3:1 |
| Detackification | Fair | Fair | Good | Fair to Good | Fair to Good |

Note: All detackification screening was performed upon a 50:50 w/w red and black high solids enamel paint.

It should be noted that a melamine-formaldehyde co-polymer sample, prepared according to U.S. Pat. No. 4,656,059 exhibited only fair detackification rating on high solids enamel paints (spray rate approximately 4.0 ml/min). In contrast, a melamine-dicyandiamide-formaldehyde polymer sample, at a mole ratio of 2.25:1 melamine:dicyandiamide, exhibited a good detackification rating and was therefore superior to the melamine-formaldehyde co-polymer sample. It should also be noted that the addition of an anionic polyacrylamide having a molecular weight between 12-15 million further improved the detackification properties of the melamine polymer whereby the detackification rating of the melamine polymer/polyacrylamide combination was improved to a good/excellent rating. Thus it is apparent that the combination of an anionic polyacrylamide and a melamine-dicyandiamide-formaldehyde polymer provided synergism as a detackifier since the detackification rating was increased from good when the polymer was used alone, to a good/excellent rating when used in combination with the polyacrylamide.

EXAMPLE 2

The example illustrates the effectiveness of a melamine-dicyandiamide-formaldehyde-propionaldehyde polymer as a detackifying agent and also illustrates the reduction of free formaldehyde content achieved by replacing a portion of the formaldehyde with propionaldehyde.

Various melamine-dicyandiamide formaldehyde propionaldehyde (MDFP) polymers were synthesized as indicated in Table 2. The reaction conditions were essentially the same as in Example 1 except that 33% (0.17 m) of the formaldehyde was replaced by 0.18 m of propionaldehyde. Since propionaldehyde is less reactive than formaldehyde, it was necessary to increase the reaction time in order to assure complete reaction. Thus, after the addition of the muriatic acid, the reaction mixture was heated at 148–150° F. for at least 4 hours. A high solids black and red base coat enamel paint was used to determine the detackification rating. The MDFP sample was compared to a melamine-dicyandiamide-formaldehyde polymer containing the regular concentration of formaldehyde (0.51m) prepared according to Example 1. The MDFP sample was also compared to a melamine-dicyandiamide-formaldehyde polymer formulated with a 30% reduction in formaldehyde concentration (0.34 m). As is apparent from Table 2, a mere reduction of the formaldehyde concentration in the polymer (i.e. a reduction from 0.51 m to 0.34 m) does not alleviate the free formaldehyde problem since the free formaldehyde content is still in excess of 0.1%. In addition, the reduction of the formaldehyde concentration in the polymer resulted in a product with poor detackification properties. However, the substitution of propionaldehyde for a portion of the formaldehyde resulted in a product with a significant decrease in free formaldehyde content (less than 0.1%) and resulted in a polymer having a good to excellent detackification rating.

TABLE 2

|  | Melamine Dicyandiamide Formaldehyde (g) | Low Mole Ratio Melamine Dicyandiamide Formaldehyde (g) | Melamine Dicyandiamide Formaldehyde Propionaldehyde (g) |
| --- | --- | --- | --- |
| Demineralized Water | 170 | 170 | 170 |
| Melamine | 17 | 17 | 17 |
| Dicyandiamide | 5 | 5 | 5 |
| Formaldehyde (37% solution) | 42 | 28.1 | 28.1 |
| Propionaldehyde | — | — | 10.47 |
| Muriatic Acid (31.61% HCl) | 16.3 | 16.3 | 16.3 |
| Demineralized Water | 250 | 250 | 250 |
| Molarity Ratios: | 0.26/0.11/1.0 | 0.39/0.17/1 | 0.4/0.18/0.5/1 |
| Detackification: | Good-Excellent | Fair to poor | Good to Excellent |
| Free Formaldehyde % | 0.36 | 0.17 | 0.08 |

NOTE: All the above polymers were screened in combination with an anionic polyacrylamide (MWT: 12–15 MM and charge density - 0.5 meq/g). The booth water pH was 9.0)

EXAMPLE 3

This example illustrates the detackification properties of the melamine-glycine-formaldehyde polymers of this invention. Samples of melamine-glycine-formaldehyde polymers, as indicated in Table 3, were synthesized according to the procedure described in Example 1 except glycine was used in place of dicyandiamide.

The detackification ratings were determined on a high solids enamel paint (black and red base coat from Eagle Pitcher and General Motors (50:50 w/w respectively). As indicated, a mole ratio of melamine:glycine of 6.2:1 provides optimum detackification.

TABLE 3

Determination of the Optimum Mole Ratio of Melamine:Glycine

| | (g) | (g) | (g) | (g) | (g) |
| --- | --- | --- | --- | --- | --- |
| Demineralized Water | 170 | 170 | 170 | 170 | 170 |
| Melamine | 22 | 12 | 17 | 20 | 21 |
| Glycine | — | 10 | 5 | 2 | 1 |
| Formaldehyde (37% active) | 42 | 42 | 42 | 42 | 42 |

TABLE 3-continued

Determination of the Optimum Mole Ratio of Melamine:Glycine

| | (g) | (g) | (g) | (g) | (g) |
| --- | --- | --- | --- | --- | --- |
| Muriatic Acid (31% active) | 16 | 16 | 16 | 16 | 16 |
| Demineralized Water | 250 | 250 | 250 | 250 | 250 |
| Melamine:Glycine Molarity Ratio | — | 0.73:1 | 2.09:1 | 6.2:1 | 13.2:1 |
| Detackification | Fair | Poor | Poor | Good to Fair | Good to Fair |

Note: All detackification screening was performed upon a 50:50 w/w red and black high solids enamel paint.
5,000 ppm of the individual co-polymer and polymers was used and the pH of the booth water raised to 9.0.

EXAMPLE 4

This example provides evidence of the unobviousness of the compositions of the subject invention. In this example, a polymer was synthesized by combining the two preferred melamine polymer formulations of this invention, i.e. synthesizing a melamine-dicyandiamide-glycine-formaldehyde polymer. This tertiary-polymer, when screened in combination with an anionic polyacrylamide on the standard high solids enamel paint combination was expected to provide optimum detackification. However, as is evident in Table 4 the relative effectiveness of the combined polymer when compared to the melamine-dicyandiamide-formaldehyde polymer or the melamine-glycine-formaldehyde polymer exhibited poor detackification and would be unacceptable in a commercial application.

TABLE 4

| | Melamine Dicyandiamide Glycine Formaldehyde (g) | Melamine Glycine Formaldehyde (g) | Melamine Dicyandiamide Formaldehyde (g) |
| --- | --- | --- | --- |
| Demineralized Water | 170 | 170 | 170 |
| Melamine | 17 | 20 | 17 |
| Dicyandiamide | 5 | | 5 |
| Glycine | 2 | 2 | — |
| Formaldehyde (37% solution) | 42 | 42 | 42 |
| Muriatic Acid (31.61% HCl) | 16.3 | 16 | 16.3 |
| Demineralized Water | 250 | 250 | 250 |

TABLE 4-continued

| | Melamine Dicyandiamide Glycine Formaldehyde (g) | Melamine Glycine Formaldehyde (g) | Melamine Dicyandiamide Formaldehyde (g) |
|---|---|---|---|
| Detackification | Poor | Fair to Good | Good to Excellent |

Note: The above polymers were screened in combination with an anionic polyacrylamide (MWT: 12-15 MM and charge density - 0.5 meq/g). The booth water pH was 9.0)

EXAMPLE 5

This example illustrates the synergism between melamine polymers and polyacrylamides. In this example, the relative detackification effectiveness of a melamine polymer sample, a polyacrylamide sample, and a melamine polymer/polyacrylamide combination sample was determined using the procedure described in Example 1. As is evident from the results in Table 5, the polyacrylamide sample exhibited poor detackification, the melamine polymer sample exhibited fair to good detackification, however, the melamine polymer/polyacrylamide sample exhibited excellent detackification.

TABLE 5

Evaluation of Synergy Between Melamine Polymers and a Polyacrylamide

| Vol. Paint Sprayed | 40 ml | 40 ml | 40 ml |
|---|---|---|---|
| pH During Test | 10.0 | 10.0 | 10.0 |
| Concentration of Detackifier | Polyacrylamide (20 ppm) | Melamine/ Dicyanamide/ Formaldehyde (5,000 ppm) | Melamine/ Dicyandiamide/ Formaldehyde (5,000 ppm) and Anionic Polyacrylamide (10 ppm) |
| Results | Poor | Fair to Good | Excellent |

Note: All detackification screening was performed upon a 50:50 w/w red and black high solids enamel paint.

we claim:

1. A composition of matter which is useful for detackifying paint particles in spray booth water comprising a melamine polymer obtained from a reaction of melamine, aldehyde and dicyandiamide and wherein the molar rations of melamine: aldehyde:dicyandiamide are in the range of (0.25-0.40):(1):(0.2-0.03).

2. A composition according to claim 1 wherein the aldehyde is selected from the group consisting of formaldehyde, propionaldehyde, acetaldehyde, acrolein, crotonaldehyde, and mixtures thereof.

3. A composition according to claim 1 wherein the aldehyde is formaldehyde.

4. A composition according to claim 1 wherein the aldehyde is a mixture of formaldehyde and propionaldehyde.

5. A composition according to claim 4 wherein the composition has a free formaldehyde content of less than 0.1%.

6. A composition according to claim 1 wherein the melamine polymer comprises the reaction product of melamine, aldehyde and dicyandiamide and wherein the mole ratio of melamine:dicyandiamide is between 2.0–2.5:1.

7. A composition according to claim 6 wherein the mole ratio of melamine:dicyandiamide is 2.25:1.

8. A composition of matter for use in detackifying paint particles in spray booth water comprising a melamine copolymer obtained from a reaction of melamine, aldehyde and dicyandiamide wherein the mole ratio of melamine:dicyandiamide is between 2.0–2.5:1 and which is blended with a nonionic or anionic polyacrylamide having a molecular weight less than 15 million or with a cationic polyacrylamide having a molecular weight less than 7 million and wherein the weight ratio of melamine copolymer:polyacrylamide is in the range of 5000-200:1.

9. A composition according to claim 8 wherein the polyacrylamide is anionic or nonionic and has a molecular weight between 12 and less than 15 million.

10. A composition of matter which is useful for detackifying paint particles in spray booth water comprising a polymer obtained from the reaction of melamine, aldehyde and an amine containing compound selected from the group consisting of dicyandiamide and glycine, wherein the molar rations of melamine:amine:aldehyde are in the range of 0.25–0.40:0.030–0.20:1, wherein the aldehyde is a mixture of formaldehyde and propionaldehyde; wherein the composition has a free formaldehyde content of less than 0.1%, and wherein the composition is blended with either a cationic polyacrylamide having a molecular weight less than 7 million or a nonionic or anionic polyacrylamide having a molecular weight in the range 12–-million.

11. A composition of matter which is useful for detackifying paint particles in spray booth water comprising a polymer obtained from the reaction of melamine, aldehyde and an amine containing compound selected from the group consisting of dicyandiamide and glycine, wherein the molar ratios of melamine:amine:aldehyde are in the range of 0.25–0.40:0.030–0.20:1, wherein the aldehyde is a mixture of formaldehyde and propionaldehyde; wherein the composition has a free formaldehyde content of less than 0.1%, and wherein the melamine polymer content of less than 0.1%, and wherein the melamine polymer is blended with a polyacrylamide.

12. A composition according to claim 11 wherein the amine-containing compound is glycine, and wherein the molar ration of melamine: glycine in the copolymer is between 6-6.5:1.

13. A composition according to claim 12 wherein the molar ration of melamine:glycine in the polymer is between 6.2:1.

14. A composition according to claim 12 wherein the aldehyde is formaldehyde.

15. A composition according to claim 12 wherein the aldehyde is a mixture of formaldehyde and propionaldehyde.

16. A composition according to claim 15 wherein the free formaldehyde content is less than 0.1%.

17. A composition according to claim 12 wherein the melamine polymer is blended with either a cationic polyacrylamide having a molecular weight less than 7 million or a nonionic or anionic polyacrylamide having a molecular weight in the range 12 to 15 million.

18. A composition prepared adding a melamine polymer obtained from the reaction of melamine, aldehyde, and an amine containing compound selected from the group consisting of dicyandiamide and glycine, wherein the molar ratios of melamine:amine:aldehyde are in the range of 0.25–0.40:0.030–0.20:1 to a paint spray booth recirculating water system containing paint particles, wherein the melamine polymer is added in an amount effective to detackify the paint particles, b) transferring the detackified paint particles to a solids concentrating equipment together with a first flocculant to concentrate the solids into a sludge blanket, c) skimming off and transferring the sludge blanket to a dewatering apparatus to form a dewatered sludge containing 30 to 70% solids, d) drying the dewatered sludge in an air drying unit to about 80 to 90 percent solids, and e) recovering the dried product.

* * * * *

UNITED STATES PATENT AND TRADEMARK OFFICE
CERTIFICATE OF CORRECTION

PATENT NO. : 5,298,186
DATED : March 29, 1994
INVENTOR(S) : Mitchell et al

It is certified that error appears in the above-indentified patent and that said Letters Patent is hereby corrected as shown below:

Column 10:
In Claim 10, line 26 after the word "range" delete "12--million" and insert therefor --12-15 million--.

In Claim 11, line 37 after the word "polymer" delete "content of less than 0.1%, and wherein the melamine polymer".

Signed and Sealed this

Twelfth Day of July, 1994

Attest:

BRUCE LEHMAN

Attesting Officer

Commissioner of Patents and Trademarks